United States Patent Office 3,243,433
Patented Mar. 29, 1966

3,243,433
STEROIDS OF THE 19-NORPREGNANE SERIES
Josef Fried, Princeton, and Mariano A. Guiducci, Edison, N.J., assignors, by mesne assignments, to E. R. Squibb & Sons, Inc., New York, N.Y., a corporation of Delaware
No Drawing. Filed Aug. 4, 1961, Ser. No. 129,234
12 Claims. (Cl. 260—239.55)

This invention relates to, and has for its objects the provisions of new physiologically active steroids, methods for preparing the same, and intermediates useful in such preparations.

The final products of this invention are steroids which are 16,17-acetal and ketal derivatives of 16α,17α-dihydroxy-19-norpregnene-3,20-dione steroids, and include steroids of the general formulae

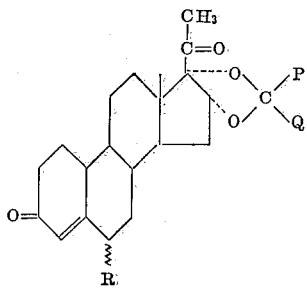

and

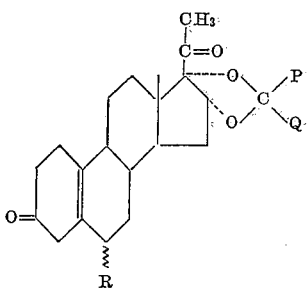

wherein R is in either the alpha or beta position and represents hydrogen or lower alkyl; P is hydrogen, lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; Q is lower alkyl, halo lower alkyl, monocyclic cycloalkyl, monocyclic cycloalkyl lower alkyl, monocyclic aryl, monocyclic aryl lower alkyl, monocyclic heterocyclic or monocyclic heterocyclic lower alkyl; or together with the carbon to which they are joined P and Q is a monocyclic cycloalkyl or monocyclic heterocyclic radical.

The final products of this invention are physiologically-active substances which possess progestational activity and hence can be used in lieu of known progestational agents, such as progesterone, in the treatment of habitual abortion. For this purpose, they can be administered in the same manner as progesterone, for example, the dosage being adjusted for the relative potency of the particular steroid. The compounds of this invention can also be administered perorally in the form of tablets. Moreover, it has surprisingly been found that the compounds of this invention are many times more active than are the corresponding 19-methylated derivatives.

The compounds of this invention can be prepared by reducing a compound of the formula

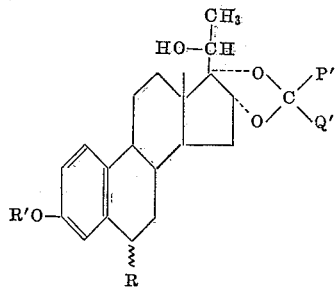

wherein R (in either the alpha or beta position) is as hereinbefore defined; R' is lower alkyl (preferably methyl); P' is hydrogen, lower alkyl, halo lower alkyl, monocyclic cycloalkyl, or monocyclic cycloalkyl lower alkyl; Q' is lower alkyl, halo lower alkyl, monocyclic cycloalkyl or monocyclic cycloalkyl lower alkyl; or together with the carbon to which they are joined P' and Q' is a monocyclic cycloalkyl, to yield new intermediates of this invention of the general formula

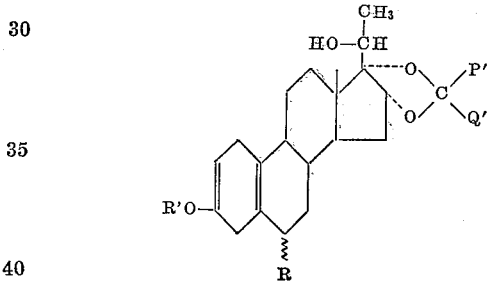

wherein R, R', P' and Q' are as hereinbefore defined.

Suitable starting materials for the process of this invention can be prepared as described in our application, Serial No. 129,233, filed on even date herewith, now U.S. Patent No. 3,077,471, and include the 16,17-cyclic acetals and ketals of 19-nor-3-(lower alkoxy)-1,3,5(10)-pregnatriene-16α,17α,20β-triols, such as 19-nor-3-methoxy-1,3,5(10)-pregnatriene-16α,17α,20β-triol; and 19-nor-3-(lower alkoxy)-6-(lower alkyl)-1,3,5(10)-pregnatriene-16α,17α,20β-triols, such as 19-nor-3-methoxy-6α-methyl-1,3,5(10)-pregnatriene-16α,17α,20β-triol and 19-nor-3-methoxy - 16β - methyl - 1,3,5(10) - pregnatriene - 16α, 17α,20β-triol; with aldehydes and ketones, such as the lower alkanals of at least two carbon atoms, the di(lower alkyl)ketones, the cycloalkanones, the cycloalkyl lower alkanals, the cycloalkyl lower alkanones, the dicycloalkyl ketones, the halo-lower alkanals, and the halo-lower alkanones.

The reduction is preferably carried out in liquid ammonia using an alkali metal, such as lithium, as the reducing agent.

The enol ether formed is then hydrolyzed. The nature of the product formed will depend on the conditions of the hydrolysis. Thus, if a mineral acid (e.g., dilute sulfuric acid) is used as the hydrolyzing agent, a 4-pregnene of the following formula is formed:

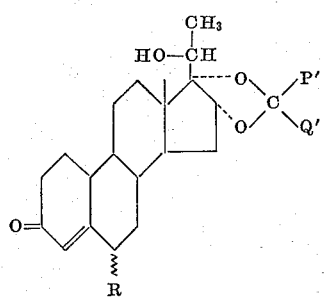

wherein R, P' and Q' are as hereinbefore defined. These compounds are new intermediates of this invention and have progestational activity per se.

If, however, the hydrolysis is carried out by use of an organic carboxylic acid (e.g. oxalic acid), then a 5(10)-pregnene of the following formula is formed:

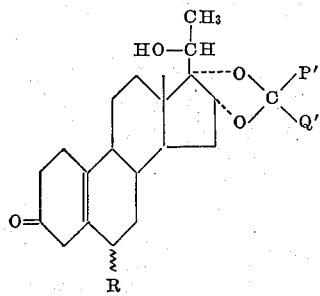

wherein R, P' and Q' are as hereinbefore defined. These compounds are also new intermediates of this invention and possess progestational activity.

The 20β-hydroxy derivatives formed are then oxidized, as by treatment with a hexavalent chromium compound (e.g., chromium trioxide) to yield the corresponding 20-keto derivatives of the following formulae respectively:

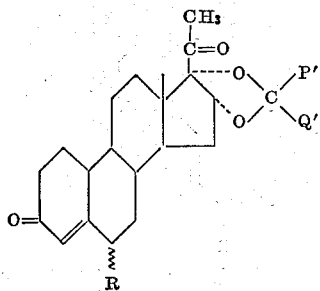

and

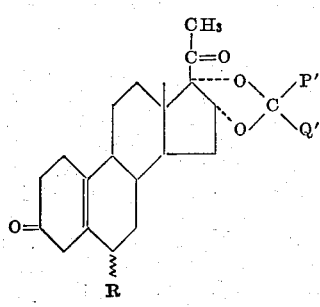

wherein R, P' and Q' are as hereinbefore defined, which are new compounds of this invention.

To prepare other 16,17-acetal and ketal derivatives, and especially the acetals and ketals with aromatic aldehydes and ketones, the acetal or ketal group is hydrolyzed by treatment with formic acid. If concentrated aqueous formic acid is used (e.g., 90% formic acid), a 16-formic acid ester is formed initially, which is then hydrolyzed by treatment with 10% aqueous potassium carbonate in methanol to yield the free 16,17-dihydroxy steroid derivatives. These free 16,17-dihydroxy steroids are new intermediates of this invention which are of the formula

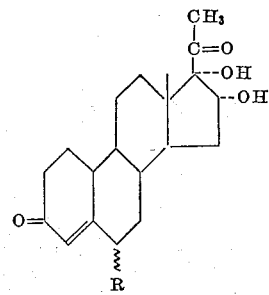

wherein R is as hereinbefore defined.

These free 16,17-dihydroxy steroids can then be reacted with an aldehyde or ketone of the formula

wherein P and Q are as hereinbefore defined. The reaction is preferably carried out by treating a suspension or solution of the dihydroxy steroid in the aldehyde or ketone (or an organic solvent and the aldehyde or ketone, if the aldehyde or ketone is a solid) with an acid catalyst (e.g., perchloric acid, p-toluenesulfonic acid, hydrochloric acid, etc.), neutralizing the acid and recovering the acetal or ketal derivative formed.

Suitable aldehyde and ketone reactants include lower alkanals of at least two carbon atoms, such as paraldehyde, propanal and hexanal;
di(lower alkyl)-ketones, such as acetone, diethylketone,
  dibutylketone, methylethylketone, and methylisobutylketone;
cycloalkanones, such as cyclobutanone, cyclopentanone,
  cyclohexanone, suberone, and cyclodexanone;
cycloalkyl (lower alkanals), such as
cyclopropylcarboxaldehyde,
cyclobutylcarboxaldehyde,
cyclopentylcarboxaldehyde,
cyclohexylcarboxaldehyde,
cycloheptylcarboxaldehyde,
cyclooctylcarboxaldehyde,
cyclopropylacetaldehyde,
cyclobutylacetaldehyde,
cyclopentylacetaldehyde,
cyclohexylacetaldehyde,
β-cyclopentylpropionaldehyde,
γ-cyclohexylbutyraldehyde, and
3-cyclopropylcaproaldehyde;
cycloalkyl(lower alkanones), such as
cyclopropyl methyl ketone,
cyclobutyl ethyl ketone,
cyclopentyl propyl ketone,
cyclopentylmethyl methyl ketone,
cyclohexylmethyl ethyl ketone,
cyclopentylethyl ethyl ketone,
cyclopropylpropyl methyl ketone,
cyclohexyl n-pentyl ketone,
cyclohexyl methyl ketone, and
cyclooctyl methyl ketone;
dicycloalkyl ketones, such as
dicyclopropyl ketone,
dicyclobutyl ketone,
dicyclopentyl ketone,
dicyclohexyl ketone,
cyclopentyl cyclohexyl ketone,
cyclopropylmethyl cyclopropyl ketone,
2-cyclobutylethyl cyclopropyl ketone,
3-cyclopentylmethyl cyclopentyl ketone,
5-cyclohexylhexyl cyclohexyl ketone, di(cyclopentylmethyl) ketone,
cyclohexylmethyl cyclopentyl ketone, and
di(4-cyclohexylpentyl) ketone;
cycloalkyl monocyclic aromatic ketones, such as
cyclopropyl phenyl ketone,
cyclohexyl p-chlorophenyl ketone,
cyclopentyl o-methoxyphenyl ketone,
cyclopentyl o,p-dihydroxyphenyl ketone,
cyclohexyl m-tolyl ketone,
cyclopropyl p-ethylphenyl ketone,
cyclopropyl p-nitrophenyl ketone, and
cyclohexyl p-acetamidophenyl ketone;
cycloalkyl (lower alkyl) monocyclic aromatic ketones, such as
cyclopentylmethyl phenyl ketone;
cycloalkyl monocyclic aromatic (lower alkyl) ketones, such as
cyclopentyl benzyl ketone,
cyclohexyl phenethyl ketone, and
cyclobutyl benzyl ketone;
cycloalkyl (lower alkyl) monocyclic aromatic (lower alkyl) ketones, such as
cyclopentylmethyl benzyl ketones;
cycloalkyl monocyclic heterocyclic ketones, such as
cyclopentyl 2-furyl ketone,
cyclohexyl 2-thienyl ketone, and
cyclopropyl 2-pyridinyl ketone;
cycloalkyl (lower alkyl) monocyclic heterocyclic ketones, such as
cyclopentylmethyl 2-piperidinyl ketone,
cyclohexylethyl 2-morpholinyl ketone and
cyclopropyl 2-thienyl ketone;
cycloalkyl monocyclic heterocyclic (lower alkyl) ketones, such as
cyclopentyl thenyl ketone,
cyclohexyl furfuryl ketone and
cyclopropyl 2-piperidinylmethyl ketone;
halo-lower alkanals, such as chloral hydrate,
trifluoroacetaldehyde hemiacetal, and
heptafluorobutanal ethyl hemiacetal;
halo-lower alkanones, such as 1,1,1-trifluoroacetone;
monocyclic carbocyclic aromatic aldehydes, such as
benzaldehyde,
halobenzaldehydes (e.g. p-chlorobenzaldehyde and p-fluorobenzaldehyde),
lower alkoxybenzaldehydes (e.g. o-anisaldehyde),
di(lower alkoxy)benzaldehydes (e.g. vertraldehyde),
hydroxybenzaldehydes (e.g. salicylaldehyde),
dihydroxybenzaldehydes (e.g. resorcyaldehyde),
lower alkyl benzaldehydes (e.g. m-tolualdehyde and p-ethylbenzaldehyde),
di(lower alkyl) benzaldehydes (e.g. o,p-dimethylbenzaldehyde),
nitrobenzaldehydes,
acylamidobenzaldehydes (e.g. N-acetylanthranilaldehyde), and
cyanobenzaldehydes;
monocyclic carboxylic aromatic lower alkanals, such as
phenylacetaldehyde,
α-phenylpropionaldehyde,
β-phenylpropionaldehyde,
γ-phenylbutyraldehyde, and
aromatically-substituted halo lower alkoxy, hydroxy, lower alkyl, nitro, acylamido and cyano derivatives thereof;
monocyclic heterocyclic aldehydes, such as
picolinaldehydes,
furfural,
thiophene carbonals, and
halo, lower alkoxy, hydroxy, lower alkyl, nitro, and cyano derivatives thereof;
monocyclic heterocyclic lower alkanals,
monocyclic carbocyclic aromatic ketones, such as
acetophenone,
α,α,α-trifluoroacetophenone,
propiophenone,
butyrophenone,
balerophenone,
isocaprophenone,
halophenyl lower alkyl ketones (e.g. p-chloroacetophenone and p-chloropropiophenone),
(lower alkoxy) phenyl lower alkyl ketones (e.g. p-anisyl methyl ketone),
di(lower alkoxy)phenyl lower alkyl ketones,
hydroxy-phenyl lower alkyl ketones,
dihydroxyphenyl lower alkyl ketones (e.g. resacetophenone),
(lower alkyl) phenyl lower alkyl ketones (e.g. methyl p-tolyl ketone),
di(lower alkyl)-phenyl lower alkyl ketones (o,p-xylyl methyl ketone),
nitrophenyl lower alkyl ketones (e.g. p-nitroacetophenone),
acylamidophenyl lower alkyl ketones (e.g. acetyl anilines), and
cyanophenyl lower alkyl ketones;
benzophenone, and mono or bis substituted halo, lower alkoxy, hydroxy, lower alkyl nitro, acylamido and cyano derivatives thereof;
monocyclic carbocyclic aromatic lower alkanones, such as
1-phenyl-3-butanone and
1-phenyl-4-pentanone, and
aromatically substituted derivatives thereof;
monocyclic heterocyclic ketones, such as
2-acetylfuran,
2-benzoylfuran,
2-acetyl-thiophene and alloxan; and
monocyclic heterocyclic lower alkanones.

The following examples illustrate the invention (all temperatures being in centigrade):

EXAMPLE 1

*19-nor-3-methoxy-2,5(10)-pregnadiene-16α,17α-20β-triol 16α,17α-acetonide*

To a solution of 235 mg. of 19-nor-3-methoxy-1,3,5(10)-pregnatriene-16α, 17α,20β-triol 16α,17α-acetonide in 50 ml. of anhydrous ether and 100 ml. of liquid ammonia is added 240 mg. of lithium wire in small pieces. After stirring at room temperature for 1 hour, 2 ml. of methanol is added dropwise over a 5 to 10 minute period, and the ammonia is allowed to evaporate. Water is then added and the mixture extracted with chloroform. The organic layer is washed with saturated sodium chloride solution, dried over magnesium sulfate, and the solvent removed in vacuo. Crystallization of the crude residue (260 mg.) from methanol yields about 190 mg. of crystalline needles, M.P. about 148–150°, which upon recrystallization from chloroform-methanol give the analytically pure enol ether with the following properties: M.P. about 157–158°; $[\alpha]_D^{23}+160°$ (c, 1.1 in chlf.)

$\lambda_{max.}^{Nujol}$ 2.87, 5.88 and 5.98 μ no selective U.V. absorption.

*Analysis.*—Calcd. for $C_{24}H_{36}O_4$ (388): C, 74.19; H, 9.34; $OCH_3$, 7.98. Found: C, 74.29; H, 9.42; $OCH_3$, 8.15.

EXAMPLE 2

*16α,17α-monofluoroacetone derivative of 19-nor-3-methoxy-2,5(10)-pregnadiene 16α,17α,20β-triol*

Following the procedure of Example 1 but substituting an equivalent amount of the 16α,17α-monofluoroacetone derivative of 19-nor-3-methoxy-1,3,5(10)-pregnatriene-16α,17α,20β-triol for the acetonide, the 16α,17α-monofluoroacetone derivative of 19-nor-3-methoxy-2,5(10)-pregnadiene-16α,17α,20β-triol is obtained.

EXAMPLE 3

*16α,17α-dicyclopropylketone derivative of 19-nor-3-methoxy-2,5(10)-pregnadiene 16α, 17α,20β-triol*

Following the procedure of Example 1 but substituting an equivalent amount of the 16α,17α-dicyclopropyl ketone derivative of 19-nor-3-methoxy - 1,3,5(10) - pregnatriene-16α,17α-20β-triol for the acetonide, the 16α,17α-dicyclopropyl ketone derivative of 19-nor-3-methoxy - 2,5(10)-pregnadiene-16α,17α,20β-triol is obtained.

Similarly, the methylisobutyl ketone derivative, the cyclohexyl methyl ketone derivative, the 1,1,1-trifluoroacetonide derivative and the heptafluorobutanol derivative of 19 - nor-3-methoxy-1,3,5(10)-pregnatriene - 16α,17α,20β-triol, yield the methylisobutyl ketone derivative, the cyclohexyl methyl ketone derivative, the 1,1,1-trifluoroacetonide derivative and the heptafluorobutanal derivative of 19-nor-3-methoxy-2,5(10)-pregnadiene-16α,17α,20β-triol.

EXAMPLE 4

*6α-methyl-19-nor-3-methoxy-2,5(10)-pregnadiene-16α,17α,20β-triol 16α,17α-acetonide*

Following the procedure of Example 1 but substituting an aquivalent amount of 6α - methyl - 19-nor-3-methoxy-1,3,5(10)-pregnatriene-16α,17α,20β-triol 16α,17α-acetonide for the acetonide, 6α-methyl - 19 - nor - 3 - methoxy-2,5(10)-pregnadiene-16α,17α,20β-triol 16α,17α-acetonide is obtained.

EXAMPLE 5

*6β-methyl-19-nor-3-methoxy-2,5(10)-pregnadiene-16α,17α,20β-triol 16α,17α-acetonide*

Following the procedure of Example 1 but substituting an equivalent amount of 6β-methyl-19-nor - 3 - methoxy-1,3,5(10)-pregnatriene-16α,17α-20β-triol 16α,17α-acetonide for the acetonide, 6β-methyl-19-nor-3-methoxy-2,5(10)-pregnaidene-16α,17α,20β-triol 16α,17α-acetonide is obtained.

EXAMPLE 6

*19-nor-4-pregnene-16α,17α-20β-triol-3-one 16α,17α-acetonide*

To a refluxing solution of 190 mg. of 19-nor-3-methoxy-2,5(10)-pregnadiene-16α,17α,20β-triol  16α,17α-acetonide in 20 ml. of methanol is added 0.60 ml. of an aqueous 8% sulfuric acid solution (w./v.) and the solution is maintained at reflux for 30 minutes. The cooled solution is diluted with water and concentrated in vacuo until most of the methanol is removed, whereupon a heavy precipitate forms. The latter is filtered, washed with water and dried in vacuo. Recrystallization from acetone-hexane gives about 95 mg. of crystalline needles M.P. about 232–237°. The analytically pure product has the following properties: M.P. about 238–240°; $[\alpha]_D^{23}+30°$ (c, 1.0 in chlf.);

$\lambda_{max.}^{Nujol}$ 2.86, 2.93, 5.97 and 6.18 $\mu$;

$\lambda_{max.}^{alc.}$ 239 m$\mu$ ($\epsilon$ = 16,000)

Analysis.—Calcd. for $C_{23}H_{34}O_4$ (374): C, 73.76; H, 9.15. Found: C, 73.67; H, 9.03.

EXAMPLE 7

*16α,17α monoflouroacetone derivative of 19-nor-4-pregnene-16α,17α,20β-triol-3-one*

Following the procedure of Example 6 but substituting an equivalent amount of the 16α,17α-monofluoroacetone derivative of 19-nor-3-methoxy - 2,5(10) - pregnadiene-16α,17α,20β-triol for the acetonide, the 16α,17α-monofluoroacetone derivative of 19 - nor - 4 - pregnene-16α,17α,20β-triol-3-one is obtained.

EXAMPLE 8

*16α,17α-dicyclopropyl ketone derivative of 19-nor-4-pregnene-16α,17α,20β-triol-3-one*

Following the procedure of Example 6 but substituting an equivalent amount of the 16α,17α-dicyclopropyl ketone derivative of 19-nor-3-methoxy-2,5(10)-pregnadiene-16α, 17α,20β-triol for the acetonide, the 16α,17α-dicyclopropyl ketone derivative of 19-nor-4-pregnene-16α,17α,20β-triol-3-one is obtained.

Similarly, the methylisobutyl ketone derivative, the cyclohexyl methyl ketone derivative, the 1,1,1-trifluoroacetonide derivative and the heptafluorobutanal derivative of 19 - nor-3-methoxy-2,5(10)-pregnadiene-16α,17α,20β-triol, yield the methylisobutyl ketone derivative, the cyclohexyl methyl ketone derivate, the 1,1,1-trifluoroacetonide derivative and the heptafluorobutanal derivative of 19-nor-4-pregnene-16α,17α,20β-triol-3-one.

EXAMPLE 9

*6α-methyl-19-nor-4-pregnene-16α,17α,20β-triol-3-one 16α,17α-acetonide*

Following the procedure of Example 6 but substituting an equivalent amount of 6α-methyl-19-nor-3-methoxy-2,5(10)-pregnadiene-16α,17α,20β-triol  16α,17α-acetonide for the acetonide, 6α-methyl-19-nor-4-pregnene-16α,17α, 20β-triol-3-one 16α,17α-acetonide is obtained.

EXAMPLE 10

*6β-methyl-19-nor-4-pregnene-16α,17α,20β-triol-3-one 16α,17α-acetonide*

Following the procedure of Example 6 but substituting an equivalent amount of 6β-methyl-19-nor-3-methoxy-2,5(10)-pregnadiene-16α,17α,20β-triol  16α,17α-acetonide for the acetonide, 6β-methyl-19-nor-4-pregnene-16α,17α, 20β-triol-3-one 16α,17α-acetonide is obtained.

EXAMPLE 11

*19-nor-5(10)-pregnene-16α,17α,20-triol-3-one 16α,17α-acetonide*

To a solution of 17.5 mg. of 3-methoxy-19-nor-2,5(10)-pregnadiene-16α,17α,20-triol 16α,17α-acetonide in 4.5 ml. of methanol is added 0.9 ml. of a solution containing 230 mg. of oxalic acid in 3 ml. of water. The reaction mixture is stirred at room temperature, poured into ice-water, and extracted with chloroform. The combined chloroform extracts are washed with sodium bicarbonate solution and saturated sodium chloride solution, dried over sodium sulfate and evaporated to dryness in vacuo.

EXAMPLE 12

*16α,17α-monofluoroacetone derivative of 19-nor-5(10)-pregnene-16α,17α,20β-triol-3-one*

Following the procedure of Example 11 but substituting an equivalent amount of the 16α,17α-monofluoroacetone derivative of 19-nor-3-methoxy-2,5(10)-pregnadiene-16α,17α-20β-triol for the acetonide, the 16α,17α-monofluoroacetone derivative of 19-nor-5(10)-pregnene-16α, 17α,20β-triol-3-one is obtained.

EXAMPLE 13

*16α,17α-dicyclopropyl ketone derivative of 19-nor-5(10)-pregnene-16α,17α,20β-triol-3-one*

Following the procedure of Example 11 but substituting an equivalent amount of the 16α,17α-dicyclopropyl ketone derivative of 19-nor-3-methoxy-2,5(10)-pregnadiene-16α,17α,20β-triol for the acetonide, the 16α,17α-dicyclopropyl ketone derivative of 19-nor-5(10)-pregnene-16α,17α,20β-triol-3-one is obtained.

Similarly, the methylisobutyl ketone derivative, the cyclohexyl methyl ketone derivative, the 1,1,1-trifluoroacetonide derivative and the heptafluorobutanal derivative of 19 - nor - 3-methoxy-2,5(10)-pregnadiene-16α,17α,20β- triol, yield the methylisobutyl ketone derivative, the cyclohexyl methyl ketone derivative, the 1,1,1-trifluoroacetonide derivative and the heptafluorobutanal derivative of 19-nor-5(10)-pregnene-16α,17α,20β-triol-3-one.

EXAMPLE 14

6α-methyl-19-nor-5(10)-pregnene-16α,17α,20β-triol-3-one 16α,17α-acetonide

Following the procedure of Example 11 but substituting an equivalent amount of 6α-methyl-19-nor-3-methoxy-2,5(10)-pregnadiene-16α,17α,20β-triol 16α,17α-acetonide for the acetonide, 6α-methyl-19-nor-5(10)-pregnene-16α,17α,20β-triol-3-one 16α,17α-acetonide is obtained.

EXAMPLE 15

6β-methyl-19-nor-5(10)-pregnene-16α,17α,20β-triol-3-one 16α,17α-acetonide

Following the procedure of Example 11 but substituting an equivalent amount of 6β-methyl-19-nor-3-methoxy-2,5(10)-pregnadiene-16α,17α,20β-triol 16α,17α-acetonide for the acetonide, 6β-methyl-19-nor-5(10)-pregnene-16α,17α,20β-triol-3-one 16α,17α-acetonide is obtained.

EXAMPLE 16

19-nor-16α,17α-dihydroxyprogesterone 16α,17α-acetonide

To a solution of 34 mg. of 19-nor-4-pregnene-16α,17α,20β-triol-3-one 16α,17α-acetonide in 8 ml. of acetonide is added slowly with stirring 0.8 ml. of a solution containing 16 mg. of chromium trioxide and 26 mg. of sulfuric acid in 90% aqueous acetone. After stirring for a total of 15 minutes methanol is added to reduce the excess chromium trioxide. The solution is diluted with water and concentrated in vacuo to remove most of the acetone and methanol. The residual suspension is filtered, washed with water and the precipitate dried in vacuo. Crystallization from acetone-hexane yields about 25 mg. of needles, M.P. about 224–227°, which on recrystallization from acetone-hexane gives the analytically pure 19-nor-16α,17α-dihydroxyprogesterone acetonide of the following properties: M.P. about 228–230° $[\alpha]_D^{23}$ +81° (c, 1.1 in chlf.);

$\lambda_{max.}^{Nujol}$ 5.85, 5.95 and 6.16 μ

$\lambda_{max.}^{alc.}$ 238 mμ (ε=16,250)

Analysis.—Calcd. for $C_{23}H_{32}O_4$ (372): C, 74.16; H, 8.66. Found: C, 74.04; H, 8.54.

EXAMPLE 17

19-nor-5(10)-pregnene-16α,17α-diol-3,20-dione 16α,17α-acetonide

A solution of 25 mg. of 19-nor-5(10)-pregnene-16α,17α-20-triol-3-one-16α,17α-acetonide dissolved in 0.5 ml. of pyridine is added to a suspension of 20 mg. of $CrO_3$ in 0.5 ml. of pyridine and the reaction mixture is stirred overnight at room temperature. The mixture is then taken up in water and extracted with chloroform. The chloroform extract is washed with water and sodium bicarbonate solutions, dried over sodium sulfate and evaporated to dryness in vacuo. The crude residue, 25 mg., is chromatographed on 500 mg. of neutral alumina. Elution with 200 ml. of benzene yields 19-nor-5(10)-pregnene-16α,17α-diol-3,20-dione 16α,17α-acetonide.

EXAMPLE 18

16α,17α-monofluoroacetone derivative of 19-nor-16α,17α-dihydroxyprogesterone

Following the procedure of Example 16 but substituting an equivalent amount of the 16α,17α-monofluoroacetone derivative of 19-nor-4-pregnene-16α,17α,20β-triol-3-one for the acetonide, the 16α,17α-monofluoroacetone derivative of 19-nor-16α,17α-dihydroxyprogesterone is obtained.

EXAMPLE 19

16α,17α-dicyclopropyl ketone derivative of 19-nor-16α,17α-dihydroxyprogesterone

Following the procedure of Example 16 but substituting an equivalent amount of the 16α,17b-dicyclopropyl ketone derivative of 19-nor-4-pregnene-16α,17α,20β-triol-3-one for the acetonide, the 16α,17α-dicyclopropyl ketone derivative of 19-nor-16α,17α-dihydroxyprogesterone is obtained.

Simlarly, the methylisobutyl ketone derivative, the cyclohexyl methyl ketone derivative, the 1,1,1-trifluoroacetonide derivative and the heptafluorobutanal derivative of 19-nor-4-pregnene-16α,17α,20β-triol-3-one, yield the methylisobutyl ketone derivative, the cyclohexyl methyl ketone derivative, the 1,1,1-trifluoroacetonide derivative and the heptafluorobutanal derivative of 19-nor-16α,17α-dihydroxyprogesterone.

EXAMPLE 20

6α-methyl-19-nor-16α,17α-dihydroxyprogesterone 16α,17α-acetonide

Following the procedure of Example 16 but substituting an equivalent amount of 6α-methyl-19-nor-4-pregnene-16α,17α-20β-triol-3-one 16α,17α-acetonide for the acetonide, 6α-methyl-19-nor-16α,17α-dihydroxyprogesterone 16α,17α-acetonide is obtained.

EXAMPLE 21

6β-methyl-19-nor-16α,17α-dihydroxyprogesterone 16α,17α-acetonide

Following the procedure of Example 16 but substituting an equivalent amount of 6β-methyl-19-nor-4-pregnene-16α,17α,20β-triol-3-one 16α,17α-acetonide for the acetonide, 6β-methyl-19-nor-16α,17α-dihydroxyprogesterone 16α,17α-acetonide is obtained.

EXAMPLE 22

16α,17α-monofluoroacetone derivative of 19-nor-5(10)-pregnene 16α,17α-diol-3,20-dione Following the procedure of Example 17 but substituting an equivalent amount of the 16α,17α-monofluoroacetone derivative of 19-nor-5(10)-pregnene-16α,17α,20β-triol-3-one for the acetonide, the 16α,17α-monofluoroacetone derivative of 19-nor-5(10)-pregnene-16α,17α-diol-3,20-dione is obtained.

EXAMPLE 23

16α,17α-dicyclopropyl ketone derivative of 19-nor-5(10)-pregnene-16α,17α-diol-3,20-dione Following the procedure of Example 17 but substituting an equivalent amount of the 16α,17α-dicyclopropyl ketone derivative of 19-nor-5(10)-pregnene-16α,17α,20β-triol-3-one for the acetonide, the 16α,17α-dicyclopropyl ketone derivative of 19-nor-5(10)-pregnene-16α,17α-diol-3,20-dione is obtained.

Similarly, the methylisobutyl ketone derivative, the cyclohexyl methyl ketone derivative, the 1,1,1-trifluoroacetonide derivative and the heptafluorobutanal derivative of 19 - nor - 5(10) - pregnene - 16α,17α,20β - triol-3-one, yield the methylisobutyl ketone derivative, the cyclohexyl methyl ketone derivative, the 1,1,1-trifluoroacetonide derivative and the heptafluorobutanal derivative of 19-nor-5(10)-pregnene-16α,17α-diol-3,20-dione.

EXAMPLE 24

6α-methyl-19-nor-5(10)-pregnene-16α,17α-diol-3,20-dione 16α,17α-acetonide

Following the procedure of Example 17 but substituting an equivalent amount of 6α-methyl-19-nor-5(10)-pregnene-16α-17α,20β-triol-3-one 16α,17α-acetonide for the acetonide, 6α-methyl-19-nor-5(10)-pregnene-16α,17α-diol-3,20-dione 16α,17α-acetonide is obtained.

EXAMPLE 25

*6β-methyl-19-nor-5(10)-pregnene-16α,17α-diol-3,20-16α,17α-acetonide*

Following the procedure of Example 17 but substituting an equivalent amount of 6β-methyl-19-nor-5(10)-pregnene-16α,17α,20β-triol-3-one 16α,17α-acetonide for the acetonide, 6β-methyl-19-nor-5(10)-pregnene-16α,17α-diol-3,20-dione 16α,17α-acetonide is obtained.

EXAMPLE 26

*19-nor-16α,17α-dihydroxyprogesterone*

A solution of 830 mg. of 19-nor-16α,17α-dihydroxyprogesterone 16α,17α-acetonide in 25 ml. of 88% formic acid is allowed to remain at 42° for 22 hours. At the end of that period the formic acid is removed completely in vacuo and the crude residue is dissolved in 83 ml. of oxygen-free methanol. To this solution is added under nitrogen 16.6 ml. of an oxygen-free 10% potassium carbonate solution and the mixture is allowed to remain at room temperature under nitrogen for 30 minutes. 1.7 ml. of glacial acetic acid is then added followed by 100 ml. of water. Upon removal of the bulk of the methanol in vacuo crystallization of the resulting 19-nor-16α,17α-dihydroxyprogesterone ensues. The crystalline precipitate is filtered, dried and recrystallized from acetone-hexane. The pure material melts at about 182–184°;

$\lambda_{max.}^{KBr}$ 2.95, 587, 6.04, 6.19μ

EXAMPLE 27

*6α-methyl-19-nor-16α,17α-dihydroxyprogesterone*

Following the procedure of Example 26 but substituting an equivalent amount of 6α-methyl-19-nor-16α,17α-dihydroxyprogesterone 16α,17α-acetonide for the acetonide, 6α-methyl-19-nor-16α,17α-dihydroxyprogesterone is obtained.

EXAMPLE 28

*6β-methyl-19-nor-16α,17α-dihydroxyprogesterone*

Following the procedure of Example 26 but substituting an equivalent amount of 6β-methyl-19-nor-16α,17α-dihydroxyprogesterone 16α,17α-acetonide for the acetonide, 6β-methyl-19-nor-16α,17α-dihydroxyprogesterone is obtained.

EXAMPLE 29

*Acetophenone derivative of 19-nor-16α,17α-dihydroxyprogesterone*

A suspension of 100 mg. of 19-nor-16α,17α-dihydroxyprogesterone in 5 ml. of redistilled acetophenone and .025 ml. of 70% perchloric acid stirred at room temperature for 1½ hours. The resulting solution is neutralized with sodium bicarbonate solution and after the addition of chloroform, the layers are separated and the organic phase washed with water. Removal of the chloroform and acetophenone in high vacuum leaves a residue (95 mg.), which on recrystallization from acetone-hexane gives the pure acetophenone derivative of 19-nor-16α,17α-dihydroxyprogesterone.

EXAMPLE 30

*Benzaldehyde derivatives of 19-nor-16α,17α-dihydroxyprogesterone*

Following the procedure of Example 29 but substituting an equivalent amount of benzaldehyde for the acetophenone, the isomeric benzaldehyde derivatives of 19-nor-16α,17α-dihydroxyprogesterone are obtained which are separated by chromatography on alumina.

EXAMPLE 31

*Furfural derivatives of 19-nor-16α,17α-dihydroxyprogesterone*

Following the procedure of Example 29 but substituting an equivalent amount of furfural for the acetophenone, the isomeric furfural derivatives of 19-nor-16α,17α-dihydroxyprogesterone are obtained, which are separated by alumina chromatography.

EXAMPLE 32

*Thiopene-2-carboxaldehyde derivatives of 19α-nor-16α,17α-dihydroxyprogesterone*

Following the procedure of Example 29 but substituting an equivalent amount of thiophene-2-carboxaldehyde for the acetophenone, the thiophene-2-carboxaldehyde derivatives of 19-nor-16α,17α-dihydroxyprogesterone are obtained, which are separated by alumina chromatography.

EXAMPLE 33

*2-acetylfuran derivative of 19-nor-16α,17α-dihydroxyprogesterone*

Following the procedure of Example 29 but substituting an equivalent amount of 2-acetylfuran for the acetophenone, the 2-acetylfuran derivative of 19-nor-16α,17α-dihydroxyprogesterone is obtained.

EXAMPLE 34

*2-acetylthiophene derivative of 19-nor-16α,17α-dihydroxyprogesterone*

Following the procedure of Example 29 but substituting an equivalent amount of 2-acetylthiophene for the acetophenone, the 2-acetylthiophene derivative of 19-nor-16α,17α-dihydroxyprogesterone is obtained.

Similarly, by substituting any other aldehyde or ketone for the acetophenone in the procedure of Example 29, all other acetals and ketals of this invention can be prepared.

EXAMPLE 35

*Acetophenone derivative of 6α-methyl-19-nor-16α,17α-dihydroxyprogesterone*

Following the procedure of Example 29 but substituting an equivalent amount of 6α-methanol-19-nor-16α,17α-dihydroxyprogesterone for the 19-nor-16α17α-dihydroxyprogesterone, the acetophenone derivative of 6α-methyl-19-nor-16α,17α-dihydroxyprogesterone is obtained.

EXAMPLE 36

*Acetophenone derivative of 6β-methyl-19-nor-16α,17α-dihydroxyprogesterone*

Following the procedure of Example 29 but substituting an equivalent amount of 6β-methyl-19-nor-16α,17α-dihydroxyprogesterone for the 19-nor-16α,17α-dihydroxyprogesterone, the acetophenone derivative of 6β-methyl-19-nor-16α,17α-dihydroxyprogesterone is obtained.

The invention may be variously otherwise embodied within the scope of the appended claims.

What is claimed is:

1. A compound selected from the group consisting of steroids of the formula

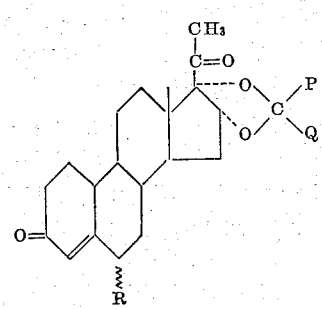

and

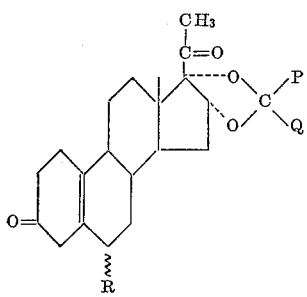

wherein R is selected from the group consisting of hydrogen and lower alkyl; P is selected from the group consisting of hydrogen, lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; Q is selected from the group consisting of lower alkyl, halo lower alkyl, monocyclic cycloalkyl, monocyclic cycloalkyl lower alkyl, monocyclic aryl, monocyclic aryl lower alkyl, monocyclic heterocyclic and monocyclic heterocyclic lower alkyl; and together with the carbon to which they are joined P and Q is selected from the group carbon to which they are joined P' and Q' is monocyclic heterocyclic.

2. A compound of the formula

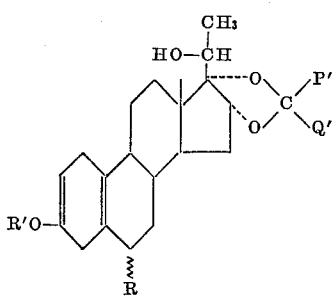

wherein R is selected from the group consisting of hydrogen and lower alkyl; R' is lower alkyl; P' is selected from the group consisting hydrogen, lower alkyl, halo lower alkyl, monocyclic cycloalkyl and monocyclic cycloalkyl lower alkyl; Q' is selected from the group consisting of lower alkyl, halo lower alkyl, monocyclic cycloalkyl and monocyclic cycloalkyl lower alkyl; and together with the carbon to which they are joined P' and Q' is monocyclic cycloalkyl.

3. 19-nor-3-methoxy - 2,5(10) - pregnadiene-16α,17α,-20β-triol 16α,17α-acetonide.

4. A compound selected from the group consisting of steroids of the formulae

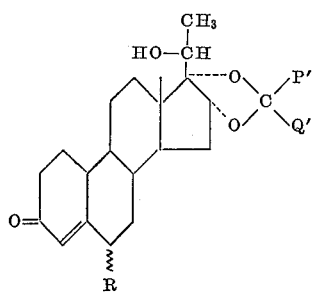

and

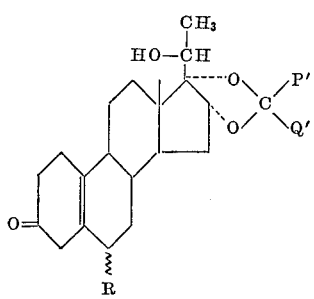

wherein R is selected from the group consisting of hydrogen and lower alkyl; P' is selected from the group consisting of hydrogen, lower alkyl, halo lower alkyl, monocyclic cycloalkyl and monocyclic cycloalkyl lower alkyl; Q' is selected from the group consisting of lower alkyl, halo lower alkyl, monocyclic cycloalkyl and monocyclic cycloalkyl lower alkyl; and together with the carbon to which they are joined P' and Q' is monocyclic cycloalkyl.

5. 19-nor-4-pregnene-16α,17α,20β-triol-3-one 16α,17α-acetonide.

6. 19-nor - 5(10) - pregnene-16α,17α,20β-triol-3-one 16α,17α-acetonide.

7. 19-nor - 16α,17α - dihydroxyprogesterone 16α,17α-acetonide.

8. 19-nor - 5(10) - pregnene-16α,17α-diol-3,20-dione 16α,17α-acetonide.

9. 19-nor - 16α,17α - dihydroxyprogesterone 16α,17α-acetophenonide.

10. A compound of the formula

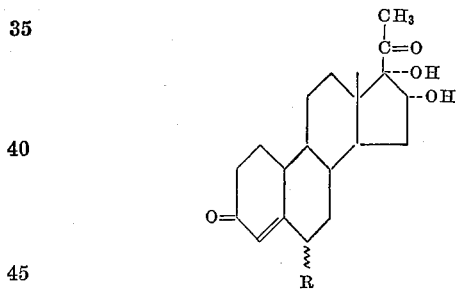

wherein R is selected from the group consisting of hydrogen and lower alkyl.

11. 19-nor-16α,17α-dihydroxyprogesterone.

12. 16α,17α-isopropylidenedioxy - 6α - methyl-19-norprogesterone.

References Cited by the Examiner

UNITED STATES PATENTS 2,941,997 6/1960 Fried _____ 260—239.55
3,002,968 10/1961 Bernstein et al. ___ 260—239.55

OTHER REFERENCES

Cooley et al., J.C.S., 1955, pp. 4373–76.
Fieser et al., Steroids, Reinhold Publishing Corp., June 25, 1959, (pp. 589 and 620 relied on).
Fried et al., Chemistry and Industry, Apr. 15, 1961, pp. 466–67.
Mills et al., J.A.C.S., vol. 82 (1960), pp. 3399–04.
Tullner et al., C.A., vol. 51, p. 8283(e), 1957.

LEWIS GOTTS, *Primary Examiner.*

M. LIEBERMAN, IRVING MARCUS, G. E. LANDE,
*Assistant Examiners.*